United States Patent [19]

Johnston, Jr.

[11] Patent Number: 4,500,815
[45] Date of Patent: Feb. 19, 1985

[54] SYSTEM FOR SEGMENTALLY REFRESHING THE STORED ELECTRON GUN DRIVE VOLTAGES OF A FLAT PANEL DISPLAY DEVICE

[75] Inventor: Loren B. Johnston, Jr., Princeton, N.J.

[73] Assignee: RCA Corporation, New York, N.Y.

[21] Appl. No.: 322,171

[22] Filed: Nov. 17, 1981

[51] Int. Cl.³ .................... H01J 29/70; H01J 29/72
[52] U.S. Cl. .................................... 315/366; 315/383
[58] Field of Search ................ 315/366, 383, 367; 313/422; 358/74, 168

[56] References Cited

U.S. PATENT DOCUMENTS

| | | | |
|---|---|---|---|
| 4,121,137 | 10/1978 | Credelle | 315/366 |
| 4,126,814 | 11/1978 | Marlowe | 315/307 |
| 4,167,690 | 9/1979 | Gange | 315/366 |
| 4,344,021 | 8/1982 | Johnston | 315/366 |

Primary Examiner—Theodore M. Blum
Assistant Examiner—Gregory C. Issing
Attorney, Agent, or Firm—Eugene M. Whitacre; Dennis H. Irlbeck; Lester L. Hallacher

[57] ABSTRACT

A system for sequentially refreshing segments of the stored voltage characteristics of electron guns includes a clock gate. The clock gate passes clock pulses to a counter which refreshes the stored voltage signals. After a predetermined number of counts, the counter inhibits the clock gate until a vertical blank pulse enables the clock gate and the counter resumes counting.

11 Claims, 4 Drawing Figures

SYSTEM FOR SEGMENTALLY REFRESHING THE STORED ELECTRON GUN DRIVE VOLTAGES OF A FLAT PANEL DISPLAY DEVICE

BACKGROUND OF THE INVENTION

This invention relates generally to flat panel display devices and particularly to a system for refreshing the stored electron gun drive voltages of such a device.

U.S. Pat. No. 4,126,814 issued to F. J. Marlowe discloses a system for uniformly controlling the visual display brightness of a modular flat panel display device. The display device is divided into a plurality of channels, each of which contributes a portion of every horizontal line of the visual output. Such display devices are known in the art as modular display devices. The visual display of a modular device is acceptable only when the display brightness of every channel is uniform within the perception capability of the human eye.

Additionally, the display brightness of the modules must be uniform within approximately 1% to assure that the seams between the modules are invisible. In a modular display device, every channel uses a different electron gun. The electron guns and their associated circuitry typically do not have uniform transfer characteristics and, therefore, the display brightness of the channels will vary along with the transfer characteristic variations. The Marlowe system addresses this problem by storing the brightness drive voltages required to produce 64 different predetermined levels of picture brightness for each of the electron guns. The stored drive voltages are selected from a voltage range which is divided into 256 equal incremental voltages. The electron gun is driven by the incremental voltages and the voltages produced on an electron collector are compared with a reference voltage. The incremental voltage which brings the collector voltage up to the reference voltage is then stored. This procedure is repeated for 64 reference voltages so that 64 of the 256 incremental drive voltages are stored. Accordingly, uniform brightness for all modules in the display is achieved because the brightness levels for all the modules are referenced to the same 64 reference voltages. However, because the electron gun transfer characteristics vary, the drive voltage range from which the 256 incremental voltages are selected must be sufficiently broad to include the electron gun with the greatest cut off voltage at the low end and the gun which requires the most drive to achieve maximum brightness at the high end. In many instances the electron gun characteristics are widely different so that the 256 incremental drive voltage range must be expanded to include both of these guns. As a consequence of this expansion brightness resolution is lost.

U.S. patent application Ser. No. 170,742 filed July 21, 1980 now U.S. Pat. No. 4,344,021 by Loren B. Johnston and entitled "System For Compensating For Transfer Characteristic Variations Of Electron Guns" now U.S. Pat. No. 4,344,021 describes a system which can be used in the Marlowe uniform brightness control system for adjusting the stored electron gun drive voltages. The Johnston system adjusts the stored electron gun drive voltages so that the voltage range is the same for all electron guns. A maximum number of the 256 incremental brightness drive voltages used in the Marlowe system therefore can be utilized for all of the electron guns in the display device.

U.S. Pat. No. 4,167,690 issued to R. A. Gange on Sept. 11, 1979, discloses a method of heating a line cathode in a modular flat panel display device. In the Gange method, a series of discrete heating pulses is passed through the line cathode to cause the cathode to emit electrons. During the intervals between consecutive heating pulses, the entire cathode is at the same potential and therefore during these intervals the display is generated.

In the Marlowe uniform brightness control system the stored electron gun drive voltages are periodically refreshed to correct for thermal drifts of the cathode characteristics. The required refreshing is affected during the vertical retrace time when no display is being generated on the screen. However, in the Marlowe system, the transfer characteristic is swept in a continuous pass. When pulse cathode heating is used, the only continuous time periods are the intervals between the heating pulses. These intervals are insufficient for a continuous refresh of the cathode characteristic and accordingly segmented refresh is required.

The instant invention fulfills this requirement by the provision of a system for sequentially refreshing segments of the stored electron drive voltages so that a preselected number of the drive voltages is refreshed during each of the vertical retrace periods until the entire electron gun transfer characteristic has been refreshed.

SUMMARY OF THE INVENTION

A system for controlling the brightness uniformity on the display screen of a modular flat panel display device includes a digital memory for storing electron gun control voltages in accordance with the transfer characteristics of the electron guns within the display device. An incremental voltage counter provides incremental voltages which are compared to reference voltages from a reference voltage counter whereby selected ones of the incremental voltages are stored in accordance with the reference voltage. A system for sequentially refreshing the stored voltages representative of segments of the transfer characteristic includes a clock gate for applying clock pulses to the incremental voltage counter. A means for enabling and inhibiting the clock gate is responsive to the incremental voltage counter whereby the clock gate is inhibited when the incremental voltage counter receives a predetermined number of clock pulses. A set/reset means receives gun refresh signals from the brightness control system to enable and reset the counters and to ready the enabling and inhibiting means whereby the clock gate is enabled in response to the refresh signals.

BRIEF DESCRIPTION OF THE DRAWINGS

FIG. 3b shows the operative waveforms of the circuit of FIG. 3a.

DETAILED DESCRIPTION OF THE PREFERRED EMBODIMENT

Figure 1:
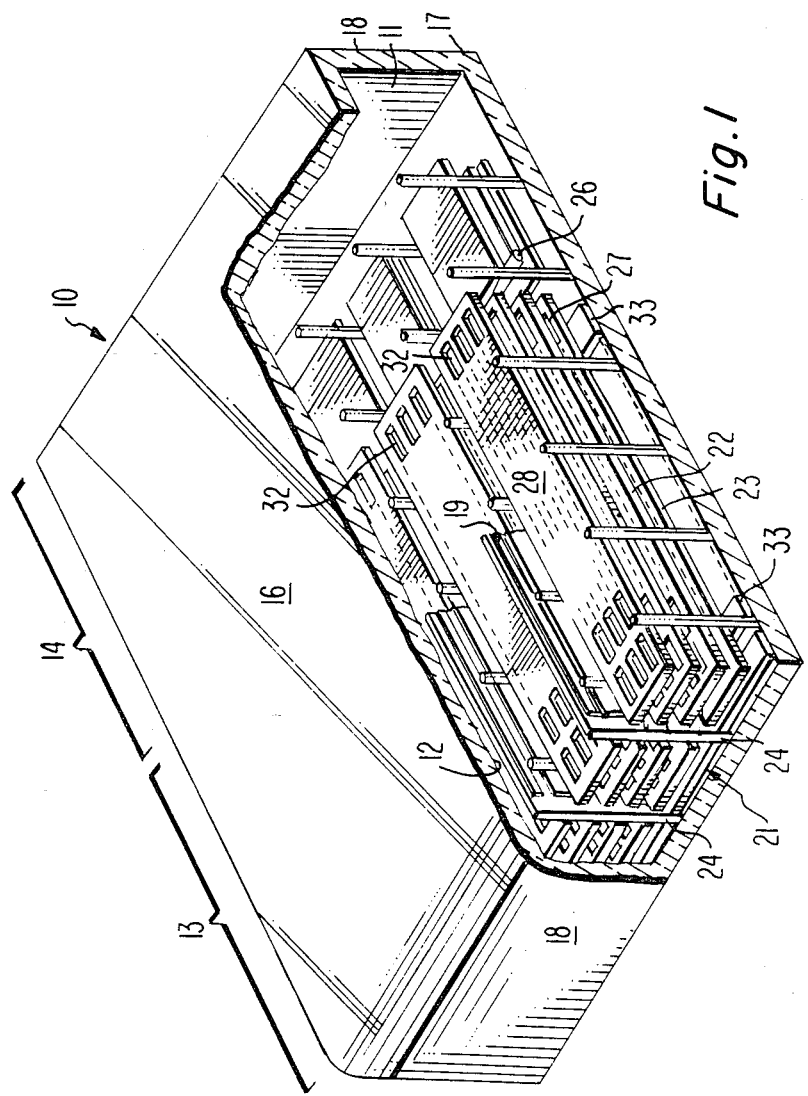
FIG. 1 is a perspective view partially broken away of a flat panel display device in which the preferred embodiment can be utilized.

In FIG. 1, a flat panel display device 10 in which the preferred embodiment can be utilized includes an evacuated envelope 11 having a display section 13 and an electron gun section 14. The envelope 11 includes a faceplate 16 and a baseplate 17 held in a spaced parallel relationship by sidewalls 18. A display screen 12 is positioned along the faceplate 16 and gives a visual output when struck by electrons.

A plurality of spaced parallel support vanes 19 is arranged between the front wall 16 and the baseplate 17 to provide the desired internal support against external atmospheric pressure and to divide the envelope 11 into a plurality of channels 21. A beam guide assembly, including spaced parallel beam guide meshes 22 and 23, a focus mesh 27, and an acceleration mesh 28 extends transversely across and longitudinally along each of the channels 21. A line cathode 26 is arranged to emit electrons into the spaces 24 between the guide meshes 22 and 23 in each channel 21 so that the electrons propagate the lengths of the channels. The channels 21 each include one electron gun for each of the three colors used to produce a color display. Accordingly, a display device having 40 channels will include 120 electron guns. The electron guns include a portion of the line cathode and electrodes which are biased to cause electrons to enter the spaces 24. Each of the meshes 22, 23, 27 and 28 contains a plurality of apertures 32, which are arranged in columns longitudinally along the meshes and in rows transversely across the meshes. Disposed on the inside surface of the backplate 17 is a plurality of extraction electrodes 33, which extend transversely across the entire transverse dimension of the envelope 11. When a particular line of the visual display is to be printed on the display screen 12, a negative voltage is applied to one of the extraction electrodes 33 so that the electrons are ejected from between the guide meshes 22 and 23 of every channel and travel to the screen 12 to produce one line of the visual display. Accordingly, each of the channels 21 contributes to the entire line of the visual display and for this reason uniform brightness controls across the visual display is required.

Figure 2:
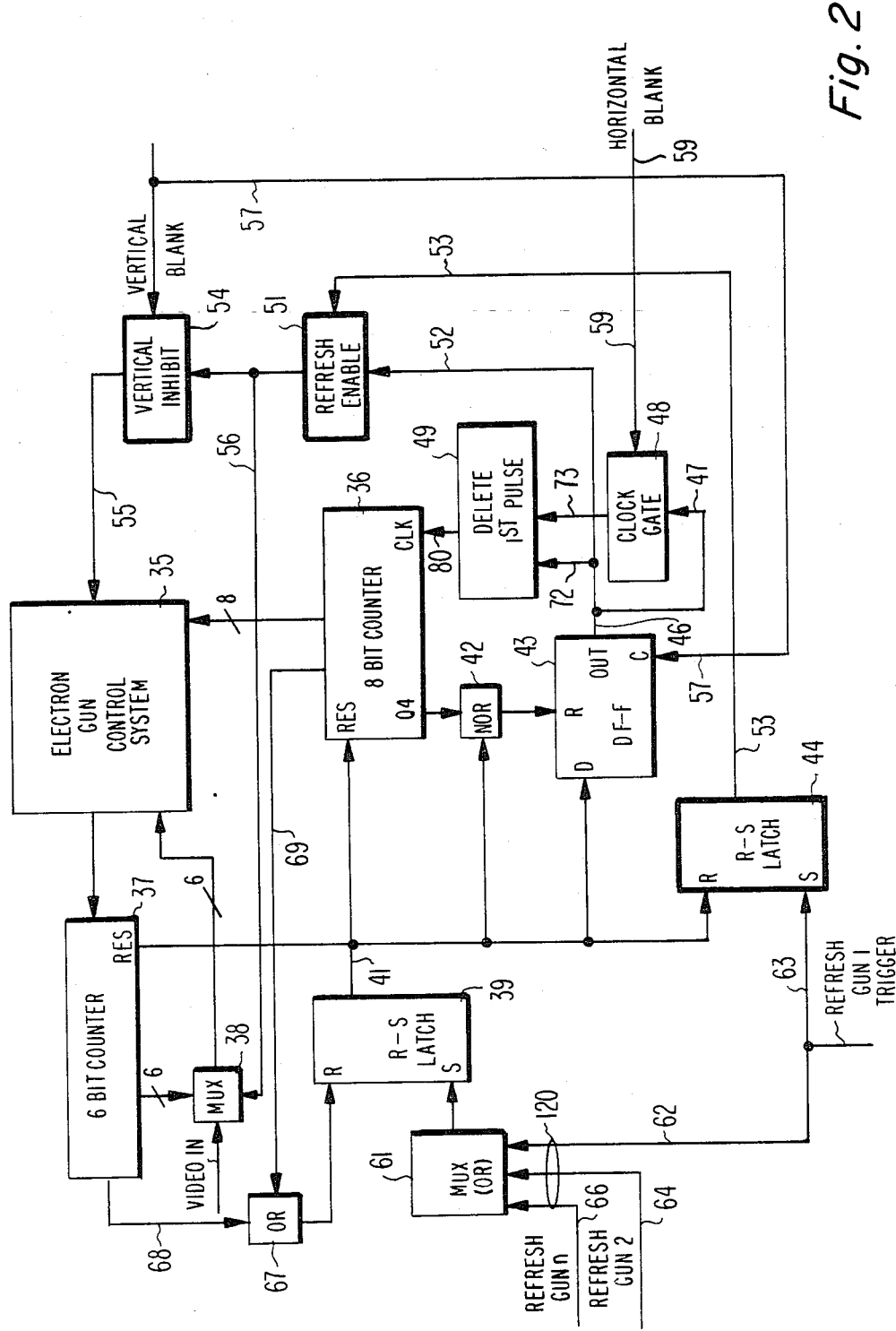
FIG. 2 is a preferred embodiment of the instant invention.

FIG. 2 shows an electron gun control system 35 of the type described in Marlowe U.S. Pat. No. 4,126,814. As described in the Marlowe patent, an 8 bit counter 36 provides 256 incremental gun drive voltages to a digital memory (not shown) within the system. These incremental gun drive voltages are compared to 64 reference voltages which are supplied by a 6 bit counter 37 so that 64 of the 256 incremental voltages from the 8 bit counter 36 are stored in the system memory. The reference signals from the counter 37 are applied to the gun control system 35 through a multiplexing circuit 38. The video input signals also are applied to the control system 35 through the multiplexer 38. The electron gun control voltages stored within the memory of the gun control system 35 are sequentially segmentally refreshed by interrupting the counter 36 between each 16 counts segment. Thus, after 16 counts, the counter 36 is inhibited until the next vertical blanking pulse is received by the system. This pulse enables the refresh system and the counter 36 resumes counting, at the count where counting stopped, for an additional 16 counts. This operation continues until the full 64 reference voltages stored in the digital memory of the gun control system have been refreshed.

The system for segmentally refreshing the gun control memory includes an R-S latch 39, the output lead 41 of which is connected to the reset inputs of the 8-bit counter 36 and a 6 bit counter 37. The output of R-S latch 39 also is connected to a NOR gate 42, the D input of a D type flip flop 43 and the reset input of another R-S latch 44. The Q4 output of the 8 bit counter 36 is coupled through the NOR gate 42 to the reset input of the D type flip flop 43. The output lead 46 of the D type flip flop 43 is coupled by a line 47 to a clock gate 48. The clock gate 48 provides the system clock pulses to the counter 36 through a delete first pulse circuit 49. The delete first pulse circuit 49 prevents the first pulse from the clock gate 48 from reaching the counter 36 for reasons and in a manner described in detail hereinafter.

A refresh enable gate 51 receives the output of the D flip flop 46 over a line 52 and the output of the R-S latch 44 over a line 53. The output of the refresh enable gate 51 is provided to a vertical inhibit gate 54 and to the multiplexer 38 by way of a lead 56.

The electron gun control system 35 receives the vertical blank signal from the vertical inhibit gate 54 over a line 55. The vertical blank pulses are also provided to the clock input of the D type flip flop 43 over a line 57. The horizontal blank pulses are applied by a line 59 to the clock gate 48.

A multiplex circuit 61 receives a refresh gun 1 trigger pulse by way of a lead 62. The refresh gun 1 trigger pulse also is applied to the Set input of the R-S latch 44 by a lead 63. The output of the multiplex circuit 61 is coupled to the Set input of the R-S latch 39. The multiplex circuit 61 acts in much the same manner as an OR gate to receive the refresh gun pulses for the 120 electron guns of the system 35. The lines 62, 64 and 66 represent the lines for the first, second and nth guns. Accordingly, the refresh pulses and the multiplex circuit 61 are identical to those of the electron gun control system described in the Marlowe patent.

When the R-S latch 39 receives a Set input from the multiplex circuit 61, the 8 bit counter 36 and the 6 bit counter 37 are enabled and the D type flip flop 43 is readied to commence the segmented refresh of the memory within the electron gun control circuit 35. The Reset input of the R-S latch 39 is coupled to the output of an OR gate 67 which receives an overflow pulse from the 6 bit counter 37 by way of a lead 68 after the last reference signal is provided by the counter. The OR gate 67 also receives an overflow pulse by way of a line 69 from the 8 bit counter 36 after the counter has output the full 256 incremental voltages. Typically, the 6 bit counter will reach the count of 64 to reset the latch 39 prior to the 8 bit counter 36 reaching 256. However, because the 8 bit counter overflow is connected to the OR gate, the R-S latch 39 will be reset even if the 6 bit counter 37 fails to reach the full count.

The R-S latch 44, the refresh enable gate 51 and the vertical inhibit gate 54 are shown in heavier blocks to indicate that every gun of the display device requires one of these circuits. Accordingly, a 40 module display device will contain 120 of each of these circuits. The R-S latch 39, the D flip-flop 43, the NOR gate 42, the clock gate 48 and the delete first pulse circuit 49 are common to all guns of the display device and are added to the Marlowe gun control system 35 in order to effect the required segmental refresh of the control voltages stored in the system memory.

In operation, a refresh gun 1 trigger pulse is received on lines 62 and 63. The signal on line 63 sets the latch circuit 44 and the signal on line 62 sets the latch 39 through the multiplex circuit 61. The output on line 41 of the latch 39 enables the counters 36 and 37 to ready the counters for counting. The output of the latch 41 also readies the D flip flop 43 by supplying the required signal to the D input. The output of the latch 44 enables the refresh enable gate 51 by way of the line 53. The leading edge of the first vertical blanking pulse available on line 57 after the refresh trigger pulse is received clocks the D flip flop 43 thereby transferring the D input data to the output lead 46 of the flip flop. The output of the flip flop is applied by the line 47 to the clock gate 48 and the gate 48 is enabled. The horizontal blank pulse train applied to the gate 48 over the line 59 serves as the system clock and is applied to the clock input of the 8 bit counter 36 through the delete first pulse circuit 49. The 8 bit counter then begins counting. The output of the D flip flop 43 is also applied to the vertical inhibit gate 54 through the refresh enable gate 51 so that vertical blanking for the gun number 1 (or whichever other gun is being refreshed) is inhibited. The output of the refresh enable gate 51 also is applied by line 56 to the multiplex circuit 38 to couple the 6 bit counter 37 input to the electron gun control system 35. In this condition, operation of the Marlowe system commences in the manner described in the Marlowe patent and application Ser. No. 170,742.

The 8 bit counter 36 continues to apply incremental voltages to the gun control system until the count of 16 is reached at which time the Q4 of the counter output goes low because of the inherent operation of the counter. This output is provided through the NOR gate 42 to the R input of the D flip flop 43 resulting in the resetting of the flip flop and the inhibiting of the clock gate 48. With the clock gate 48 inhibited, the horizontal blanking pulses cannot pass through the gate and counting by the 8 bit counter 36 ceases. When the next vertical blank interval is commenced, the leading edge of the vertical blank pulse clocks the D flip flop 43 and the clock gate 48 is enabled again. The horizontal blanking pulses are again provided to the counter 36 through the delete first pulse 49. The counter 36 resumes counting with the count 17 and continues to count for the next 16 count segment. When the 32 count is reached, Q4 goes low and the clock gate 48 is again inhibited. This operation continues for 16 cycles, each of which constitutes a 16 count segment of the gun transfer characteristic, until either the 256 incremental voltages, or all 64 reference voltages from the counter 37 are applied to the gun control system 35. In either event, whichever of the counters, 36 or 37 times out first, an overflow pulse is provided to the OR gate 67 to reset the latch 39 resulting in the resetting of the 8 bit counter 36 and the 6 bit counter 37 and the latch 44.

The clock gate 48 is turned on and off by the output of the D flip flop 43 and therefore an incremental voltage is available to the electron gun control system 35 from the counter 36 at the beginning of each refresh sequence. For this reason, the counter 36 should not be clocked until this last available incremental voltage has been compared to the reference signal set by the 6 bit counter 37. The delete first pulse circuit 49, a preferred embodiment of which is shown in FIG. 3a, fulfills this requirement.

Figure 3A:
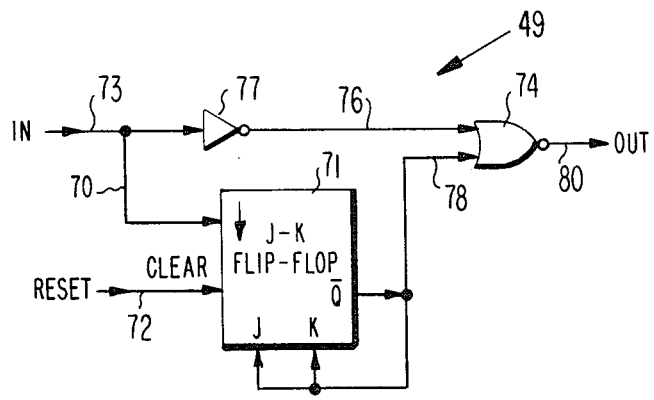
FIG. 3a is a preferred embodiment of a circuit for deleting the first pulse of a repetitive pulse train which can be used in the instant invention.
Figure 3B:
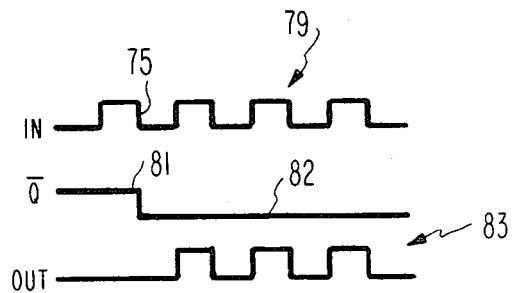

In FIG. 3a, a J-K flip flop 71 receives a clear pulse on an input lead 72 and the clock pulse train from the clock gate 48 on the line 73 and input lead 70. The $\overline{Q}$ output of the J-K flip flop is connected to an input lead 78 of a NOR gate 74 and to the J and K inputs of the flip flop. The other input lead 76 of the NOR 74 receives the clock pulse train through an inverter 77. The J-K flip flop 71 toggles, or switches, when the J and K inputs are both high but there is no change in the $\overline{Q}$ output when the J and K inputs are low. When the first pulse 75 of the pulse train 79 of FIG. 3b is applied to line 73, the pulse is inverted by the inverter 77 and the input on line 76 is low. The $\overline{Q}$ output of the J-K 71 is high and therefore the output of the NOR gate 74 is low. The trailing edge of the pulse 75 toggles the J-K flip flop and the $\overline{Q}$ output goes low, as indicated at 82 in FIG. 3b. The input lead 78 is low so that the pulse train on input lead 76 passes through the NOR gate 74 and the pulse train 83 is available on output lead 80. When the $\overline{Q}$ output of the J-K flip flop 71 is low, the J and K inputs of the flip flop also are low and the flip flop is inhibited until a pulse is provided to the clear input lead 72 to ready the flip flop for the next pulse train. Accordingly, the first pulse 75 of the clock is eliminated but the other pulses of the clocking pulse train are applied to the 8 bit counter 36.

What is claimed is:

1. In a brightness control system for controlling brightness uniformity on the display screen of a modular flat panel display device, said system including a digital memory for storing electron gun control voltages in accordance with the transfer characteristics of the electron guns within said display device, an incremental voltage counter for providing incremental voltages to said memory, a reference voltage counter for providing reference voltages to said system whereby selected ones of said incremental voltages are stored in said memory in accordance with said reference voltages; an improvement for sequentially refreshing stored voltages representative of segments of said transfer characteristic comprising:

clock gate means for applying clock pulses to said incremental voltage counter;

means for enabling and inhibiting said clock gate, said means for enabling and inhibiting being responsive to said incremental voltage counter whereby said clock gate is inhibited when said incremental voltage counter receives a predetermined number of clock pulses;

set/reset means for receiving gun refresh signals from said brightness control system and for enabling said counters and readying said means for enabling and inhibiting whereby said clock gate is enabled in response to said set/reset means, and refresh enable means responsive to said set/reset means and to said means for enabling and inhibiting whereby said brightness control system is in a refresh mode when said clock gate is enabled and in a different mode when said clock gate is inhibited.

2. The improvement of claim 1 further including vertical blank inhibit means responsive to said refresh enable means whereby said brightness control system is inhibited from vertical blanking.

3. The improvement of claim 2 further including signal directing means for directing the output of said reference voltage counter to said brightness control system, said signal directing means being responsive to said refresh enable means whereby said reference voltage counter output is directed to said brightness control system during said refresh mode.

4. The improvement of claim 3 wherein said set/reset means includes first and second latch circuits, said first and second latch circuits being set by said gun refresh signal and said second latch being reset by said first latch.

5. The improvement of claim 4 wherein said first and second latches are R-S latches.

6. The improvement of claim 5 wherein said means for enabling and inhibiting is a D type flip flop.

7. The improvement of claim 6 wherein said clock pulses are the horizontal blanking pulses of said brightness control system.

8. The improvement of claim 7 further including delete first pulse means arranged between said clock gate and said incremental voltage counter.

9. The improvement of claim 1 or 3 further including delete first pulse means arranged between said clock gate and said incremental voltage counter.

10. The improvement of claim 9 wherein said set/reset means includes first and second latch circuits, said first and second latches being set by said gun refresh signal and said second latch being reset by said first latch.

11. The improvement of claim 10 wherein said first latch circuit is responsive to overflow pulses from said incremental voltage counter and from said reference voltage counter whereby said counters and said improvement are reset to commence said refresh mode in response to an overflow pulse from one of said counters.

* * * * *